United States Patent [19]
Tokunaga et al.

[11] Patent Number: 5,128,218
[45] Date of Patent: Jul. 7, 1992

[54] SEALED LEAD-ACID BATTERY

[75] Inventors: Akio Tokunaga; Toshiaki Hayashi; Teruhiro Hatanaka; Masahiko Kosai; Takao Omae, all of Kyoto, Japan

[73] Assignee: Japan Storage Battery Co., Ltd., Kyoto, Japan

[21] Appl. No.: 655,696

[22] Filed: Feb. 15, 1991

[30] Foreign Application Priority Data

| Feb. 15, 1990 | [JP] | Japan | 2-34611 |
| May 25, 1990 | [JP] | Japan | 2-136077 |
| May 26, 1990 | [JP] | Japan | 2-54924[U] |
| Jun. 19, 1990 | [JP] | Japan | 2-160458 |
| Oct. 24, 1990 | [JP] | Japan | 2-286410 |

[51] Int. Cl.$^5$ .................................. H01M 10/10
[52] U.S. Cl. ..................... 429/57; 429/134; 429/146; 429/225; 429/245
[58] Field of Search ............... 429/225, 228, 245, 190, 429/204, 143, 147, 134, 135, 57, 60, 53, 132, 146

[56] References Cited

U.S. PATENT DOCUMENTS

| 1,651,226 | 11/1927 | Pearson | 429/176 |
| 3,177,096 | 4/1965 | Jache | 429/190 X |
| 3,402,077 | 9/1968 | Kida et al. | 429/190 X |
| 3,457,112 | 7/1969 | Reber | 429/190 X |
| 3,711,332 | 1/1973 | Bestacky | 429/190 X |
| 3,765,942 | 10/1973 | Jache | 429/190 |
| 3,993,507 | 11/1976 | Harding | 429/176 |
| 4,447,508 | 5/1984 | Jensen | 429/57 |

FOREIGN PATENT DOCUMENTS 787872 12/1957 United Kingdom.

OTHER PUBLICATIONS

Patent Abstracts of Japan, vol. 9, No. 277 (E-355), Nov. 6, 1985, Yuasa Denki K.K.

Primary Examiner—Anthony Skapars
Attorney, Agent, or Firm—Sughrue, Mion, Zinn, Macpeak & Seas

[57] ABSTRACT

A sealed lead-acid battery which includes a container accommodating an assembled element. The assembled element has at least one electrochemically formed positive plate having a grid of an antimony-free alloy, wherein the plate is made of porous active material. The assembled element also includes at least one electrochemically formed negative plate having a grid of an antimony-free lead alloy, wherein the plate is made of a porous active material. A separator, having a plurality of projections on one or both side thereof, is inserted between the positive and negative plates. A layer of powder is placed between the positive and negative plates and around the assembled element. The powder is composed of a closely packed powder, which is acid-resistant and hydrophilic, and has gas channels within its interior. The powder is immobilized with an acid-resistant porous layer placed above the powder, wherein the porous layer is permeable to gases and liquids, and impervious to particles of the powder. Sulfuric acid electrolyte is impregnated and retained within the positive and negative plates and the powder layer in a substantially necessary and sufficient amount for charging and discharging the battery.

25 Claims, 4 Drawing Sheets

SEALED LEAD-ACID BATTERY

BACKGROUND OF THE INVENTION

This invention relates to an improvement in sealed lead-acid batteries.

Sealed lead-acid batteries that make use of a phenomenon called "oxygen cycle" (i.e. oxygen gas evolved during charging is absorbed by the negative electrode) are available in two types, a retainer-type and a gel-type. In a retainer type sealed lead-acid battery, a mat separator (glass separator) made of fine glass fibers is inserted between a positive and a negative plate in order to retain the necessary amount of sulfuric acid electrolyte for charging and discharging the battery and for keeping the electrodes apart. The retainer-type battery has many advantages such as maintenance-free operation, no electrolyte leakage and attitude independence. Consequently, this battery has recently been used in increasing volume as a power source for portable equipment, cordless convenience devices and computer backups. The glass separator used in retainer-type sealed batteries is a mat of very fine glass fibers of a diameter of approximately 1 micron or less, which are made by a special technique. Therefore, the separator is considerably more expensive than separators in common use with lead-acid batteries. Furthermore, in order to attain the desired battery performance, an assembled element must be compressed into a container with great force, which makes the assembly of a battery difficult and unavoidably increases the cost of battery production. Another problem with retainer type sealed lead-acid batteries is that sulfuric acid electrolyte is only retained in the glass separator inserted between positive and negative plates, so less electrolyte can participate in the charge and discharge cycles. Compared to open type common lead-acid batteries, the capacity (in particular the low-rate discharge capacity) of the retainer-type ones is low because sulfuric acid used in lead-acid batteries is one of the active material and the battery capacity is limited by the amount of electrolyte. The positive and negative plates in retainer-type sealed lead-acid batteries are usually made of grids of antimony-free lead alloy having high hydrogen overvoltage. Repeated "deep" charge and discharge cycles of these batteries forms a passivated layer of poor conductivity at the interface between the positive grid and the positive active material, leading to premature loss of the battery capacity. This phenomenon can be prevented by using the positive grid of a lead alloy containing a small amount of antimony. However, the addition of antimony lowers the hydrogen overvoltage and increases the amount of water loss during charging to such an extent that the life of the battery is exhausted prematurely and the batteries dry up, which is fatal to sealed lead-acid batteries. Hence, it has been impossible to use antimony-containing lead alloys in sealed lead-acid batteries that make use of an oxygen cycle. Compared to the retainer-type, gel-type lead-acid batteries are inexpensive but their life performance has been lower than the retainer-type and open type common lead-acid batteries that use a sufficient amount of electrolyte.

SUMMARY OF THE INVENTION

The present invention has taken into consideration these inadequacies and has as its object to provide an inexpensive sealed lead-acid battery having improved battery performance in which a powder having a higher porosity and a larger surface area than active materials in lead-acid batteries is directly placed between electrode plates and around the assembled element. The necessary amount of sulfuric acid electrolyte for charging and discharging the battery is retained in the powder.

A BRIEF DESCRIPTION OF THE DRAWINGS

DETAILED DESCRIPTION OF THE INVENTION

Figure 1:
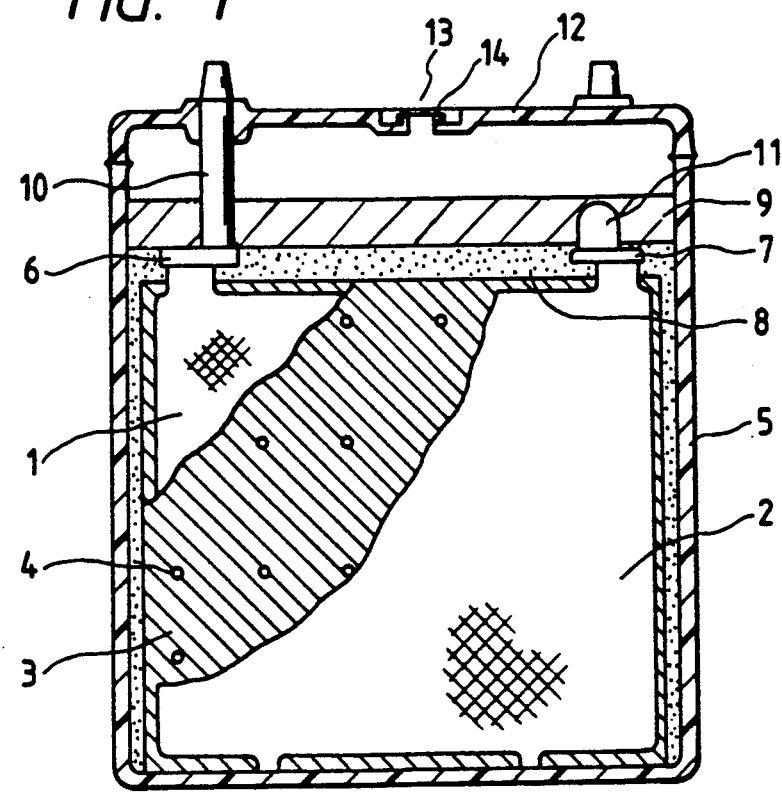
FIG. 1 is a schematic view of a sealed lead-acid battery according to an embodiment of the present invention.

Glass separators commonly used in retainer-type sealed lead-acid batteries are in mat form which have specific surface areas of 1-2 $m^2/g$ and porosities of about 90%. The greater part of the pores present are about 10 microns in size. Therefore, if the powder which is packed in a container that accommodates an assembled element, has characteristics comparable to glass separators, it should be capable of retaining the necessary amount of sulfuric acid electrolyte for charging and discharging the battery. In addition, the powder can also be placed around the assembled element, so more electrolyte can be retained than in the conventional retainer-type sealed lead-acid batteries. This promises potential improvement in battery performance. Furthermore, the need to compress the assembled element as in the retainer-type sealed lead-acid batteries is eliminated to facilitate the assembly of a battery.

In order that a powder can be used in place of glass separators commonly used in retainer-type sealed lead-acid batteries, it must have a sufficiently high porosity and large specific surface area to retain sulfuric acid electrolyte in a necessary and sufficient amount for charging and discharging the battery. Sealed lead-acid batteries which make use of an oxygen cycle require oxygen gas evolved at the positive electrode to diffuse to the negative electrode where it is absorbed. Thus channels which allow the passage of oxygen gas there through, must be formed in the layer of a powder in a closely packed condition. In order to attain a high specific surface area, a powder is used, which includes the finest possible particles. However, the interstices formed from the densely(closely) packed particles are so small that sulfuric acid electrolyte impregnated within the powder will completely fill those interstices leaving no gas channels behind. This prevents the progress of the reaction required to cause adequate absorption of the oxygen gas. Conversely, if the primary particles in the powder are coarse, the interstices between them are large thereby favoring the formation of gas channels. However, coarse powder includes small specific surface areas and are not able to retain the necessary amount of electrolyte. Under these circumstances, the present invention uses a powder comprising coarse secondary particles that are agglomerates of fine primary particles, whereby sulfuric acid electrolyte is retained by the fine primary particles in a necessary and sufficient amount for charging and discharging the battery so as to insure a smooth cell reaction. In addition, the interstices formed between closely packed coarse secondary particles are used as gas channels to permit an efficient reaction for oxygen absorption.

An example of a powder that possesses these characteristics is hydrous silicon dioxide ($SiO_2 \cdot nH_2O$), which may be prepared either by a wet method involving decomposition of sodium silicate with hydrochloric acid or sulfuric acid, or by a dry method involving the burning of a silicon halide. Hydrous silicon dioxide is an inexpensive industrial material that is generally called "white carbon". While powders in this class have various particulate forms depending on the method of preparation, all of them are highly acid resistant and hydrophilic and consist of very fine primary particles. the primary particles have a diameter of 5–40 milli-microns and a specific surface area of 20–400 $m^2/g$. Usually, these fine particles agglomerate to form secondary particles of 10–500 microns, providing a porosity of 85–90% for the powder when it is in a packed condition. The present invention has additionally discovered that the powder described above had a noteworthy characteristic, namely the high ability to adsorb antimony. The present invention is described below in detail with reference to a working example.

EXAMPLE

Figure 7:
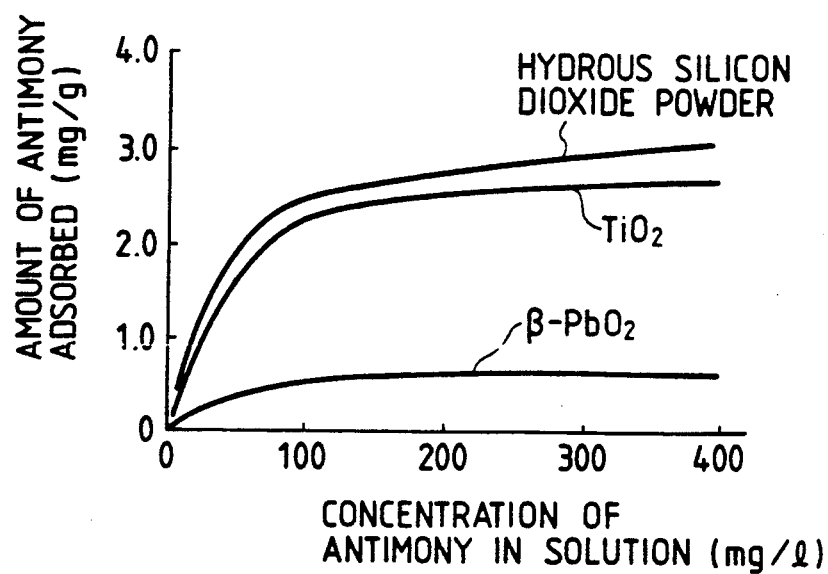
FIG. 7 is a characteristic diagram showing the antimony adsorbing capability of the powder used in the sealed lead-acid battery of the present invention.

FIG. 1 is a schematic view of the sealed lead-acid battery of the present invention. A positive plate indicated by 1 is a grid made of an antimony-free lead alloy or a low antimony lead alloy (i.e., an alloy containing a small amount of antimony) and which is filled with a positive paste. An antimony-free lead alloy can be selected from common lead-calcium alloys containing 0.02–0.12 wt. % Ca and 0.20–1.0 wt. % Sn. For consistent casting of the positive grid, the addition, of 0.001–0.01 wt. % aluminum is preferred because it prevents the oxidative loss of calcium in the melt. As noted above, the hydrous silicon dioxide powder used as an electrolyte retainer has the ability to absorb antimony, and thus antimony containing lead alloys can be used. FIG. 7 shows the results of an experiment conducted to investigate how much antimony could be adsorbed on the hydrous silicon dioxide powder.

The experimental procedure is set forth hereafter. Varying concentrations of antimony were dissolved in dilute sulfuric acid to prepare solutions (100 ml) with a specific gravity of 1.30. To each solution, 5 g of a hydrous silicon dioxide powder comprising primary particles with a diameter of 10–40 millimicrons and having a specific surface area of 120 $m^2/g$ was added. The mixtures were agitated with a magnetic stirrer at room temperature for 24 hours and the concentration of antimony in the supernatant was measured. The amount of antimony adsorbed on the hydrous silicon dioxide powder was determined from the difference between the antimony concentration of a blank solution and the concentration of antimony in each test solution. The amount of antimony adsorption on the hydrous silicon dioxide powder increased with the concentration of antimony in the solution and at antimony concentrations of 50 mg/L and above, one gram of the powder adsorbed 2.0 mg and more of antimony. This was higher than the antimony adsorption on rutile type titanium dioxide and $\beta$-form lead dioxide which are good antimony adsorbents. The antimony adsorption was dependent on the specific surface area of the hydrous silicon dioxide powder, which was capable of good antimony adsorption at values of 100 $m^2/g$ and above. These results show that antimony-containing lead alloys could be used in the positive grid as effectively as antimony-free lead alloys since antimony released from the positive electrode was trapped before it reached the negative electrode without lowering the hydrogen overvoltage. It should however be noted that the amount of antimony added is preferably as small as possible while still remaining sufficient to attain the intended effect of antimony. Hence, antimony is preferably added in an amount of 0.7–2.0 wt. %, with the range of 0.7–1.2 wt. % being particularly preferred. Antimony, arsenic (As) and tin (Sn) may be added in respective amounts of 0.1–0.3 wt. % and 0.01–0.5 wt. %. If selenium (Se) or sulfur (S) is added in very small amounts as a nucleating agent, the castability and corrosion resistance of the grid can be improved.

The paste which is applied to the positive grid may be any common positive paste, which is prepared by mixing a leady oxide powder with dilute sulfuric acid. More preferably the leady oxide powder is mixed with red lead ($Pb_3O_4$) to aid in the step of electrochemically forming the positive plate and to improve the battery performance. Red lead reacts with sulfuric acid in accordance with the following equation (1) and the resulting lead dioxide ($PbO_2$) will effectively work to aid in the formation step and to improve the battery performance:

$$Pb_3O_4 + 2H_2SO_4 = PbO_2 + 2PbSO_4 + 2H_2O \qquad (1)$$

However, if a leady oxide powder is merely mixed with red lead before dilute sulfuric acid is added for mixing, $PbO_2$ will not form. This is because the reaction expressed by the following equation (2) will proceed at a faster rate than the reaction of eq. (1), causing the added sulfuric acid to be consumed by the lead oxide (PbO) in the leady oxide powder:

$$PbO + H_2SO_4 = PbSO_4 + H_2O \qquad (2)$$

Hence, in order to form leady dioxide during the paste mixing process, it is recommended that dilute sulfuric acid be first added to red lead so as to initiate the reaction of eq. (1), with a leady oxide powder being subsequently added, followed by further mixing. In this way, lead dioxide will be formed in the amount calculated from eq. (1), whereby the quantity of electricity necessary to electroform the battery is reduced and the battery performance is improved. To this end, red lead must be used in an amount of at least 20 wt. % of the weight of the leady oxide powder.

A negative plate indicated by 2 in FIG. 1 is fabricated by pasting a grid of antimony-free lead alloy with a common negative paste incorporating an expander agent such as lignin and/or barium sulfate. The lead alloy as the material for the negative grid may be selected from among common lead-calcium alloys containing 0.02-0.12 wt. % Ca and 0.001-0.5 wt. % Sn.

The positive and negative grids described above can be manufactured by various methods such as by casting, punching sheets of lead alloys and by the expanded metal process. The pasted grids are used as electrode plates after curing in a room at 30°-50° C. The curing of positive grids is a particularly important step for battery performance.

Figure 3:
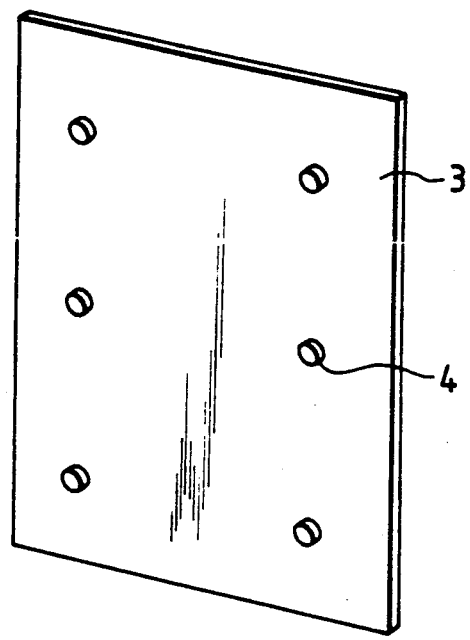
FIGS. 3 and 4 are schematic views of two examples of the separator that can be used in the sealed lead-acid battery of the present invention.
Figure 4:
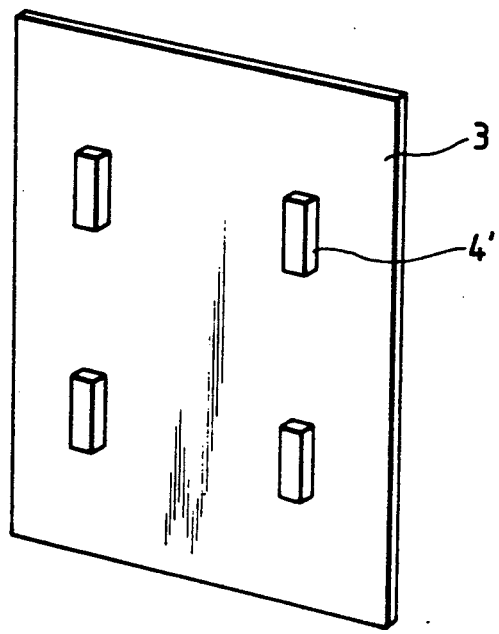

A synthetic separator 3 is inserted between the positive and negative plates. Any separator can be used as long as it is as thin as 0.02-0.3 mm, has a porosity of 70-80% and exhibits low electric resistance. Separators having pores of diameter of less than 1 micron are not preferred, since they are not highly permeable to gases. A plurality of projections 4 or 4' are provided on one or both sides of the separator 3 as shown in FIG. 3 or 4. In a sealed lead-acid battery of the type contemplated by the present invention which uses a powder as an electrolyte retainer, the powder must be packed evenly between the positive and negative plates. The projections are provided in order to keep the plates apart by a constant distance and can be easily formed by depositing, with a hot-melt gun, a molten resin in dots or in discontinuous lines on a strip sheet used for separation, which is unwound from a roll. In areas where projections are formed, pores in the separator will be blocked to cause the loss of ion conductivity. Hence, allowing the projecting areas to occupy an unduly large space is not preferred, since it would hinder battery performance. The projecting areas should not occupy more than 1% of the total area of the separator. Under these circumstances, small projections are preferably distributed over the surface of the separator in order to keep the positive and negative plates apart by a constant distance. In the present example, a synthetic separator having a thickness of 0.25 mm, a porosity of 73% and an average pore diameter of ca. 4 microns was provided on one side with a plurality of projections each having a diameter of ca. 2 mm and a height of 1.2 mm in such a way that their total area occupied ca. 0.7% of the separator surface.

The positive plates, negative plates and the separators provided with projections are stacked and assembled into an element, with the individual positive plates being soldered separately from the negative plates. The assembled element is then inserted into a container 5. Whereas, the conventional element, which uses glass separators, experiences considerable difficulty when inserting the separator into a container unless the element is compressed with great force. However, in the present invention, there is no need to compress the assembled element and it can be easily inserted into the container. After inserting the element, a powder 8 is packed both between the plates and around the element. In the example being discussed, the powder comprises fine primary particles of hydrous silicon dioxide diameters of 10-40 millimicrons and specific surface areas of 100-150 $m^2/g$. The primary particles agglomerate to form secondary particles with diameters of 50-200 microns. This powder is highly flowable and has an angle of repose of 25-30 degrees. Having such high fluidity, the powder can be closely packed into the container within a short time by applying vibrations with an amplitude of 1-2 mm under an acceleration of gravity of 2-4 g. The powder 8 is placed in such a way that a positive strap 6 and a negative strap 7 are just covered.

Figure 5:
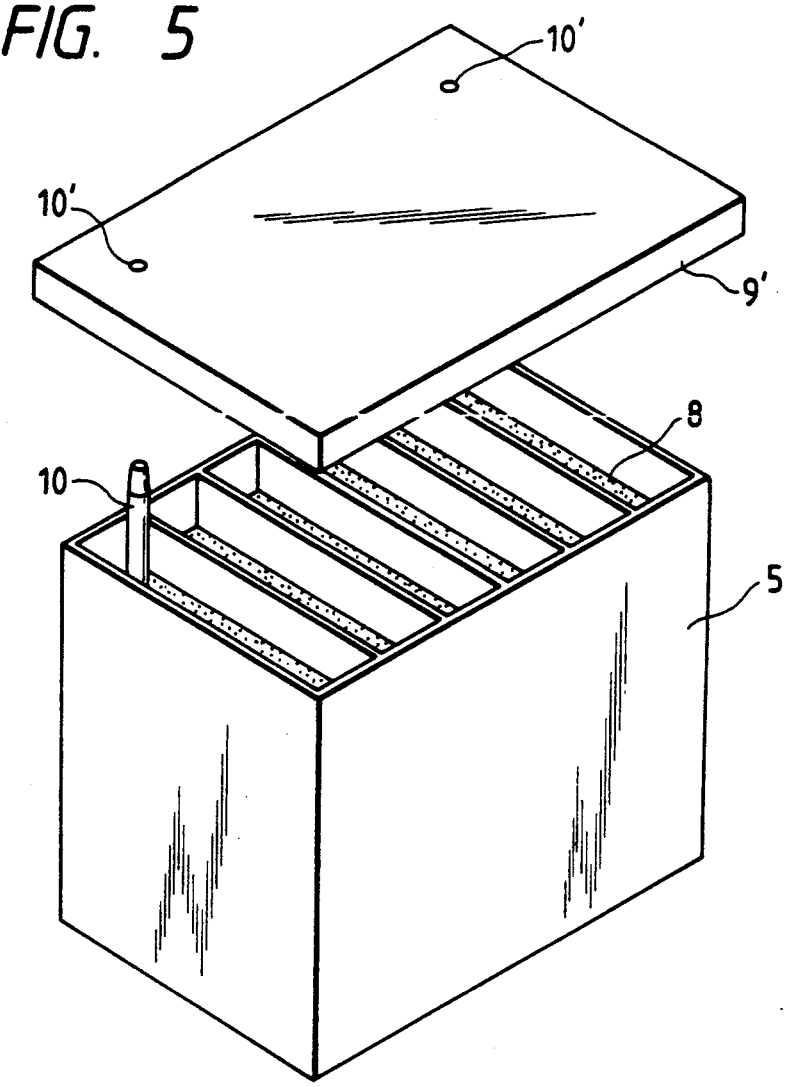
FIG. 5 illustrates a method by which the porous material to be used in the sealed lead-acid battery of the present invention is inserted into a container.

A porous layer 9 covers the top of the layer of packed powder 8. As already mentioned, the powder used in the present invention has such high fluidity that unless its layer is immobilized with the porous layer 9, the particles of the powder will readily move to create voids in its layer. These voids are especially created when sulfuric acid electrolyte is added to an uncharged battery or during gassing in the initial charge. Voids in the layer of powder are unable to retain the electrolyte and the active materials will not work effectively to attain the desired battery performance. Hence, immobilizing the layer of powder is very important. The porous layer 9 may be made of any porous material that is permeable to liquids and gases but which is impervious to the particles of the powder. Needless to say, the porous material must resist sulfuric acid without releasing any deleterious materials. A suitable example of such porous materials is a foamed phenolic resin. Foamed phenolic resins are highly acid-resistant and have sufficient strength although they are somewhat brittle. If a rectangular block 9' of phenolic resin foam that is slightly larger than the size of the container as shown in FIG. 5 is pressed against the top end of the container 5, it is cut by the edge of the top lateral sides of the container and its partitions. Thus, the block can be inserted into several cells of the container simultaneously. If small holes 10' are made in the block of phenolic resin foam in positions that correspond to cell posts 10, the latter will penetrate just snugly through the holes as the block is forced into the container. The phenolic resin foam is also snugly fitted over an intercell connector 11 by concaving in a corresponding shape. The porosity of the phenolic resin foam can be easily changed by adjusting the blow ratios. Experimental results show that blow ratios of 10-100 are appropriate. After accommodating the assembled element into the container and filling it with the powder which is then immobilized with the porous material, a cover 12 is bonded or soldered to the container 5 to complete an uncharged battery. The cover 12 has a vent plug 13 as an integral part and a vent valve 14, which will open when the pressure in the battery rises and close when the pressure decreases. The vent valve 14 may be of any common type such as a cap valve, a ring valve or a plate valve. The vent valve may be fitted either after filling the uncharged battery with sulfuric acid electrolyte or after the initial charging. In the latter case, the valve must be fitted immediately after initial charge is completed.

The electrolyte retainer used in the sealed lead-acid battery of the present invention is a powder having high fluidity as described above, and thus voids are prone to form in the layer of that powder under the pressure of gases evolved during initial charging of the battery. To avoid this problem, the powder 8 is immobilized with the porous layer 9 but, even then, the evolution of gases during charge is preferably as small as possible. The positive paste used by the present invention contains lead dioxide in the unformed active material and a smaller quantity of electricity enables the battery to be charged, whereby the problem described above can reasonably be prevented. Consider, for example, a sealed lead-acid battery having a 5-h rate capacity of 24 Amp-hours (Ah). With batteries using the conventional positive paste, electricity of 160-180 Ah is necessary for charging. However, 80-120 Ah is sufficient to charge the battery of the present invention. Since the quantity of charging electricity is reduced, less water will be electrolyzed during charging, thereby minimizing the evolution of gases. Needless to say, a smaller amount of sulfuric acid is needed within the uncharged battery. This feature can be utilized to enable the manufacture of compact batteries.

Figure 2:
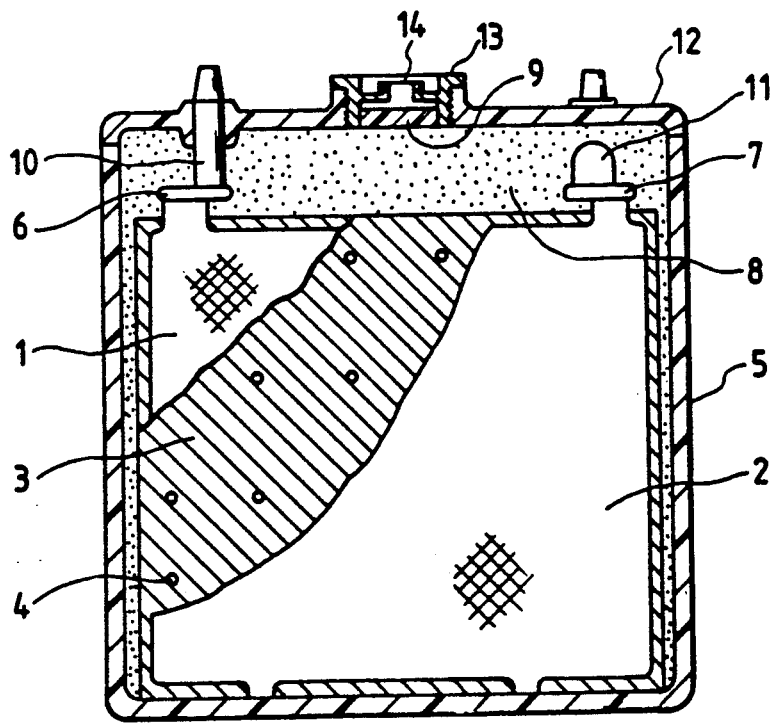
FIG. 2 is a schematic view of a sealed lead-acid battery according to another embodiment of the present invention.

FIG. 2 shows a sealed lead acid battery according to another embodiment of the present invention, in which the porous layer 9 is placed below the vent plug 13 and the vent valve 14 is placed above the plug 13 is in order to reduce the space in the upper part of the battery. In this embodiment, the container 5 accommodating the assembled element is fitted with the cover 12 by either bonding or soldering and then the powder 8 is fed into the container through the port where the vent plug 14 is to be fitted, followed by the fitting of that plug. The electrolyte is added with the vent valve 14 removed, which is fitted either after the addition of electrolyte or after charging the battery. In the embodiment shown in FIG. 2, the head space of the battery is sufficiently reduced to improve the volume energy efficiency of the battery by at least ca. 20%.

Figure 6:
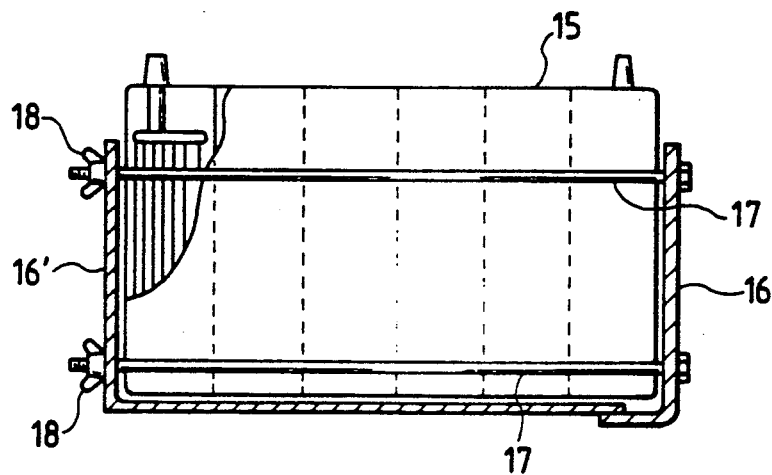
FIG. 6 illustrates the sealed lead-acid battery of the present invention with its outer wall container being enforced with rigid plates.

As is well known in the art, upon repeated charge and discharge, the thicknesses of electrode plates in a lead-acid battery will expand gradually due to the volume change of the active materials and the corrosion of the grids. The glass separators used in conventional retainer-type sealed lead-acid batteries have no rigidity, so the stress due to expansion of the plates is absorbed by the glass separators, thus preventing the container wall from deforming. On the contrary, the glass separators immersed in sulfuric acid electrolyte will lose elasticity. Therefore, to maintain the force by which the assembled element is compressed, it is necessary to assemble the battery with the element being preliminarily compressed with adequate force. This is why it has been difficult to assemble conventional retainer type sealed lead-acid batteries. In contrast, the powder used as an electrolyte retainer in the sealed lead-acid battery of the present invention has a low compressibility characteristic, so the stress due to expansion of the plates will be directly applied to the container wall, eventually causing it to deform outward. This deformation is particularly great if the battery is used at high ambient temperatures, which decreases the strength of the synthetic resin used to make the container wall. The plate expansion in the sealed lead-acid battery of the present invention exerts enough stress to deform the container wall. Therefore, a great compressive force is applied to the assembled element as reinforcement to permit the battery to exhibit superior life performance. When the container wall is reinforced against deformation, plate deterioration is suppressed to further prolong the life of the battery. Two possible ways to prevent the deformation of the container wall is by using high-strength materials for the container or by increasing the thickness of the container wall. However, these methods will increase either the weight or the cost of the battery. A convenient alternative method is to improve the battery's carrier as in automotive applications by attaching reinforcing rigid plates to container wall surfaces that are parallel to the electrode plates in the battery as shown in FIG. 6. Numeral 15 denotes the sealed lead-acid battery of the present invention, and 16 and 16' are the reinforcing plates made of iron or aluminum that are fixed to the container wall by means of bolts 17 and nuts 18.

The sealed lead-acid battery of the present invention was subject to an initial performance test and a life test and the results are described below. The test samples were 12 V automotive sealed lead-acid batteries with a nominal capacity of 25 Ah. The specifications of the batteries being tested are shown in Table 1.

TABLE 1

| Sample | Alloy of Positive Grid | Electrolyte Retainer | Remarks |
|---|---|---|---|
| A | Pb-0.10% Ca-0.70% Sn | powder | invention |
| B | Pb-1.0% Sb-0.2% As-0.2% Sn | powder | invention |
| C | Pb-0.10% Ca-0.70% Sn | glass separator | prior art |
| D | Pb-1.0% Sb-0.2% As-0.2% Sn | glass separator | prior art |

Samples A and B were batteries of the present invention using a powder as an electrolyte retainer; sample A used a lead-calcium alloy in the positive grid and sample B used a lead-antimony alloy. Samples C and D were prior art batteries using a lead-calcium and a lead-antimony alloy, respectively, in the positive grid. In each test sample the negative grid was made of a lead-calcium alloy (Pb-0.7% Ca-0.5% Sn). Needless to say, the positive plates in the samples of the present invention were made from a paste that was prepared by mixing a leady oxide powder with 30% red lead to the recipe described herein. The content of lead dioxide in the paste was found to be 5.9 wt. %. The batteries of the present invention could be charged with about 40% less electricity than the prior art batteries required. The charged batteries were subjected to a 5-h rate discharge test and a 150 A discharge test at $-15°$ C. The life test was conducted primarily for the purpose of evaluating battery performance at elevated temperatures. This test was a constant-voltage life test at 75° C. which was higher than the normal operating temperature. The test conditions are shown specifically below:

| Ambient temperature | 75° C. |
|---|---|
| Discharge | 4 min at 25 A |
| Charge | 10 min at 14.8 V (maximum current = 25 A). |

Figure 8:
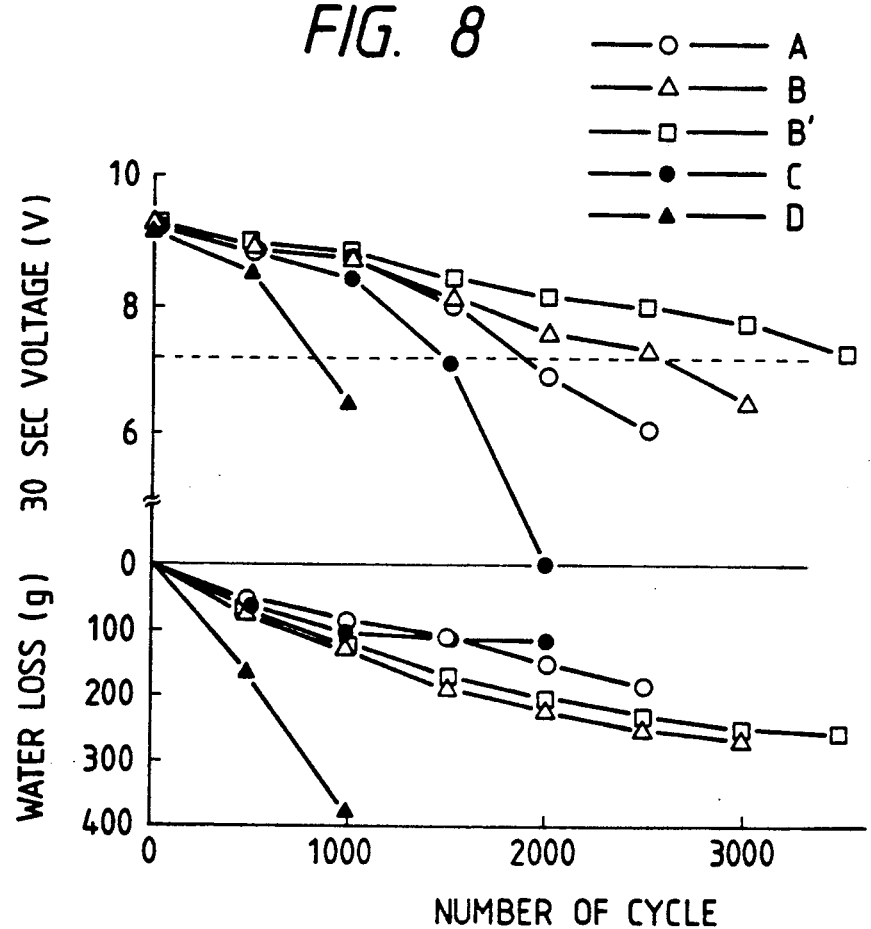
FIG. 8 is a characteristic diagram showing the life performance of the sealed lead-acid battery of the present invention.

The results of the initial performance test are shown in Table 2 and those of the life test in FIG. 8. Also subjected to the life test was battery B' which was the same as B except that the container wall was reinforced with synthetic resin laminated steel plates as shown in FIG. 6.

TABLE 2

| Sample | 5-h rate capacity | 150 A discharge test at $-15°$ C. |
|---|---|---|
| A | 27. 7 Ah | 8. 6 Ah (9. 40 V) |
| B | 28. 5 | 8. 7 (9. 20) |
| C | 25. 2 | 7. 5 (9. 40) |
| D | 24. 0 | 7. 0 (9. 20) |

*Figures in parentheses indicate 5-sec discharge voltages.

The initial performance of samples A and B of the present invention was ca. 10% better than prior art samples C and D in terms of both 5-h rate capacity and 150 A discharge capacity. This would be because the samples of the present invention could retain samples of the present invention could retain electrolyte ca. 20% more than the prior art samples and because the incorporation of red lead into the positive paste improved the formability of the positive plates.

At every 500 charge and discharge cycles under the life test conditions described above, each battery was discharged at a cold cranking current (274 A) for the 30-sec and the life test was completed when the battery failed to maintain 7.2 V (1.2 V/cell) for 30 sec. The determined battery life was 1,800 cycles for sample A, 2,600 cycles for sample B and 3,500 cycles for sample B'. These results were superior to the prior art samples C (1,400 cycles) and D (800 cycles). In particular, sample B which used a lead-antimony alloy in the positive grids exhibited life performance over three times as long as the life of prior art retainer-type sealed lead-acid battery D using the same alloy. Sample B' in which the container wall was reinforced with steel plates had an even longer life (3,500 cycles). The water loss during the life test was determined by measuring the weight of each battery at every 500 cycles. The amount of water loss is a measure for the recombination efficiency of a sealed lead-acid battery. In samples A and C using a lead-calcium alloy in the positive grids, the volume of electrolyte decreased at substantially the same rate and the water loss per se was comparatively small. The positive grids in sample B and B' which used a hydrous silicon dioxide powder as an electrolyte retainer in accordance with the present invention were made of a lead-antimony alloy and yet the water loss was just a bit greater than in samples A and C which used antimony-free positive grids. On the other hand, lead-antimony alloy in the positive grids, experienced a marked increase in a water loss due to an increased current at the end of charge. This is because antimony released from the positive grids precipitated at the negative plates, whereby the hydrogen overvoltage dropped to increase the chance of water electrolysis. This would be one of the reasons why the life of prior art battery D was extremely short. In comparison, samples B and B' of the present invention, which used a hydrous silicon dioxide powder as an electrolyte retainer, were capable of preventing the drop of hydrogen overvoltage at the negative plates, since antimony released from corroded positive grids was effectively trapped by the powder before it reached the negative plates. As a result, the water loss due to water electrolysis decreased and, combined with the better corrosion resistance of the positive grids than those made of an antimony-free alloy. This effect contributed superior life performance to samples B and B'. Examination after the life test revealed slight expansion in the container walls of sealed lead-acid batteries A and B of the present invention. However, battery B' in which the container wall was reinforced with steel plates did not deform at all. Inspection after disassembly showed that prior art sealed lead-acid batteries C and D using glass separators experienced heavy corrosion at the positive grids. In particular, the positive plates in battery C using antimony-free grids deteriorated to an unidentifiable form. In contrast, the electrode plates in the batteries of the present invention were firmly secured by the hydrous silicon dioxide powder packed into the container and they experienced only small deformation. The extent of electrode deformation was particularly small in battery B' which of electrode deformation was particularly small in battery B' which had the container wall reinforced with steel plates. This would be another reason for the superior life performance of the batteries of the present invention.

As described above, the sealed lead-acid battery of the present invention is based on two new concepts for sealed lead-acid batteries. These concepts include retaining an electrolyte by fine primary particles having a large specific area and creating interstices from relatively coarse secondary particles formed by agglomeration of those primary particles which are closely packed together and used as gas channels. This battery exhibits better performance and oxygen absorbing reactions than conventional retainer-type sealed lead-acid batteries using glass separators. In addition to the hydrous silicon dioxide powder, the electrolyte retainer for use in the sealed lead-acid battery of the present invention may be made of any powder such as one of tabular crystals of calcium silicate ($CaO \cdot 2-2.5SiO_2 \cdot H_2O$) that has acid resistance and hydrophilicity and which comprises fine primary particles have a large specific surface area and a high porosity that will agglomerate to form coarse secondary particles. If the secondary particles in the powder are friable, a suitable binder may be used. According to another discovery of the present invention, the hydrous silicon dioxide powder has the ability to easily adsorb antimony. This characteristic enables the use of antimony containing grids that have been impossible to use in conventional sealed lead-acid batteries. The result is a marked improvement in the life performance of the battery of the present invention. Furthermore, the absence of the need to compress the assembled element facilitates cost. In conventional retainer-type sealed lead-acid batteries, negative plate lugs and strap are exposed, so when the battery is used under adverse conditions such as high temperature and overchange, the lugs and strap will corrode, occasionally leading to a critical accident such as explosion of the battery. However, in the sealed lead-acid battery of the present invention, the assembled element is totally embedded in the layer of the powder specified herein. The negative plate lugs and strap will not corrode even if the battery is used under the adverse conditions described above, which is one of the major advantages of the present invention.

While a typical example of the present invention has been described above, it may be embodied in various other ways without departing from its scope and spirit. In the embodiment described above, a separator provided with a plurality of small cylindrical or linear projections is inserted between positive and negative plates. But, this separator may be omitted since the powder used in the present invention also has the characteristics of a separator. In this case, a suitable spacer is inserted between the plates to keep them apart, with the powder as an electrolyte retainer being placed both between the plates and around the assembled elements. A fairly large space must be allowed between the plates in order to prevent shorting. Experimental results showed that the space had to be at least about 1.5 mm. Secondly, a tubular sealed lead-acid battery can easily be manufactured by application of the present invention. Conventionally, glass separators cannot be used in tubular lead-acid batteries since the positive plates are not flat and this has inevitably led to the manufacture of short-lived gel-type sealed batteries. This serious drawback is eliminated by the present invention which enables a tubular sealed lead-acid battery of superior life performance to be manufactured by a simplified process.

While various embodiments have been chosen to illustrate the present invention, it will be understood by those skilled in the art that various changes and modifications can be made therein without departing from the scope of the invention as defined in the appended claims.

What is claimed is:

1. A sealed lead-acid battery with a vent valve comprising:
a container accommodating an assembled element comprising:
at least one electrochemically formed positive plate having a grid of an antimony-free alloy pasted with a porous active material,
at least one electrochemically formed negative plate having a grid of an antimony-free lead alloy pasted with a porous active material, and a separator inserted between said positive and negative plates, said separator having a plurality of projections on one or both side thereof;
a layer of powder placed between said positive and negative plates and around said assembled element, said powder layer being composed of a closely packed powder, which is acid-resistant and hydrophilic and which has a higher porosity and a larger specific surface area than said active materials said powder contains as a main component hydrous silicon dioxide ($SiO_2 \cdot nH_2O$), which comprises fine primary particles with a size of 10–500 microns, said powder layer having a specific surface area of 20–400 $m^2/g$ and a porosity of 85–90%. said powder layer having as channels in its interior and being immobilized with an acid-resistant porous layer placed above said powder layer, said porous layer being permeable to gases and liquids, and impervious to particles of said powder layer; and
sulfuric acid electrolyte impregnated and retained in said positive and negative plates and in said powder layer in a substantially necessary and sufficient amount for charging and discharging the battery.

2. The sealed lead-acid battery according to claim 1 wherein the electrolyte necessary for charging and discharging the battery is substantially retained by fine primary particles in said powder layer, and interstices, created when coarse secondary particles formed by agglomerization of said fine primary particles are closely packed, are used as gas channels through which oxygen gas, evolved at the positive electrode during charging, is absorbed by the negative electrode, said battery utilizing an oxygen cycle involving no free electrolyte.

3. The sealed lead-acid battery according to claim 1, wherein said positive plate uses a positive grid made of an antimony-free lead alloy containing 0.02–0.12 wt. % calcium, 0.20–1.0 wt. % tin and 0.001–0.01 wt. % aluminum and said negative plate uses a negative grid made of an antimony-free lead alloy containing 0.02–0.1 wt. % calcium and 0.001–0.5 wt. % tin.

4. The sealed lead-acid battery according to claim 1, wherein said separator is a low-resistance synthetic separator that has a thickness of 0.02–0.3 mm and a porosity of 70–80% and which is provided with a plurality of small cylindrical or linear projections on one or both sides thereto to supportably engage said positive and negative plates to maintain a constant distance therebetween.

5. The sealed lead-acid battery according to claim 4, wherein said plurality of small cylindrical or linear projections that block pores in the separator occupy no more than 1% of the total area of said separator.

6. The sealed lead-acid battery according to claim 4, wherein said small cylindrical or linear projections are made of an acid-resistance hot-melt resin.

7. The sealed lead-acid battery according to claim 1, wherein the positive plate is pasted with a paste prepared by mixing a leady oxide powder with red lead in an amount of at least 20 wt. % of the leady oxide powder.

8. The sealed lead-acid battery according to claim 7, wherein said positive plate comprises lead dioxide formed from a mixture of red lead and dilute sulfuric acid and leady oxide powder added to the mixture containing lead dioxide, said mixture being in the form of a paste, which is applied to a positive plate, said positive plate being cured and formed electrochemically.

9. The sealed lead-acid battery according to claim 1, wherein said porous layer is a plate of foamed phenolic resin that is greater in size than a top face of the container and which has been blown at a ratio of 10–100 to produce open cells, said plate being pressed against the top face of the container and forced into individual cells of the battery to immobilize the powder layer packed in the container.

10. The sealed lead-acid battery according to claim 1, wherein said porous layer is placed below a vent plug and the vent valve is placed above said vent plug in order to immobilize the powder layer packed in the container.

11. The sealed lead-acid battery according to claim 1, wherein rigid plates are attached to outer wall surfaces of the container parallel to the positive and negative plates in the container, thereby preventing deformation of said outer wall surfaces of the container.

12. A sealed lead-acid battery with a vent valve comprising:
a container accommodating an assembled element comprising:
at least one electrochemically formed positive plate having a grid of a lead alloy containing a small amount of antimony, said positive plate being pasted with a porous active material,
at least one electrochemically formed negative plate having a grid of an antimony-free lead alloy pasted with a porous active material,
a layer of powder placed between said positive and negative plates and around said assembled element, said powder layer being composed of a closely packed powder that is acid-resistant and hydrophilic and which has a higher porosity and a larger specific surface area than said active materials, said powder contains as a main component hydrous silicon dioxide ($SiO_2 \cdot nH_2O$) that comprises fine primary particles with a size of 5–40 millimicrons which agglomerate to from secondary particles with a size of 10 0 400 microns, said powder layer having a specific surface are of 100–400 $m^2/g$ and a porosity of 85–90% and being capable of adsorbing at least 2 mg of antimony per gram of said powder. said powder layer having gas channels in its interior and being immobilized with an acid-resistant porous layer placed on top of said powder layer and which is permeable to gases and liquids, and which is impervious to the particles of said powder; and
sulfuric acid electorlyte that is impregnated and retained in said positive and negative plates and in said layer of powder in a substantially necessary and sufficient amount for charging and discharging the battery.

13. The sealed lead-acid battery according to claim 12, wherein the electrolyte necessary for charging and discharging the battery is substantially retained by fine primary particles in said powder layer, and interstices, created when coarse secondary particles formed by agglomeration of said fine primary particles are closely packed, are used as gas channels through which oxygen gas, evolved at a positive electrode of said positive plate during charge, is absorbed by a negative electrode of said negative plate, said battery utilizing an oxygen cycle involving no free electrolyte.

14. The sealed lead-acid battery according to claim 12, wherein said grid of said positive plate is a positive grid made of a lead alloy containing 0.7–2.0 wt. % antimony, 0.1–0.3 wt. % arsenic an d0.01–0.5 wt. % tin, and said grid of said negative plate is a negative grid made of an antimony-free lead alloy containing 0.02–0.12 wt. % calcium and 0.001–0.5 wt. % tin.

15. The sealed lead-acid battery according to claim 12, wherein said separator constitutes a flat separator with small cylindrical projections on one or both sides thereof, said projections supportably engaging said positive and negative plates to maintain a constant distance therebetween.

16. The sealed lead-acid battery according to claim 12 further comprising:
a separator inserted between said positive and negative plates which has a plurality of projections on one or both sides thereof.

17. The sealed lead-acid battery according to claim 12, wherein said separator is a low-resistance synthetic separator that has a thickness of 0.02–0.3 mm and a porosity of 70–80% and which is provided with a plurality of small cylindrical or linear projections on one or both sides thereof.

18. The sealed lead-acid battery according to claim 17, wherein said plurality of small cylindrical or linear projections that block pores in the separator occupy no more than 1% of the total area of said separator.

19. The sealed lead-acid battery according to claim 17, wherein said small cylindrical or linear projections are made of an acid-resistant hot-melt resin.

20. The sealed lead-acid battery according to claim 12, wherein the positive plate is pasted with a paste comprising a mixture of a leady oxide powder and red lead in an amount of at least 20 wt. % of the leady oxide powder.

21. The sealed lead-acid battery according to claim 20, wherein said positive plate comprises lead dioxide formed from a mixture of red lead and dilute sulfuric acid and a leady oxide powder, said mixture forming a paste which is applied to a positive grid, said plate being cured and formed electrochemically.

22. The sealed lead-acid battery according to claim 12, wherein said porous layer is a plate of foamed phenolic resin that is greater in size than a top face of the container and which has been blown at a ratio of 10–100 to produce open cells, said plate being pressed against the top face of the container and forced into individual cells of the battery to immobilize the powder layer packed in the container.

23. The sealed lead-acid battery according to claim 12, wherein said porous layer is placed below a vent plug and the vent valve is placed above said vent plug in order to immobilize the powder layer packed in the container.

24. The sealed lead-acid battery according to claim 12, wherein rigid plates are attached to outer wall surfaces of the container parallel to the positive and negative plates in the container, whereby preventing deformation of said wall surfaces of the container.

25. The sealed lead-acid battery according to claim 1, wherein said separator constitutes a flat separator with small cylindrical projections on one or both sides thereof, said projections supportably engaging said positive and negative plates to maintain a constant distance therebetween.

* * * * *